US012634772B2

(12) United States Patent
Leng et al.

(10) Patent No.: US 12,634,772 B2
(45) Date of Patent: May 19, 2026

(54) METHOD AND APPARATUS FOR L1/L2-BASED INTER-CELL MOBILITY

(71) Applicant: Samsung Electronics Co., Ltd., Suwon-si (KR)

(72) Inventors: Shiyang Leng, Allen, TX (US); Kyeongin Jeong, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 488 days.

(21) Appl. No.: 18/046,383

(22) Filed: Oct. 13, 2022

(65) Prior Publication Data

US 2023/0130286 A1    Apr. 27, 2023

Related U.S. Application Data

(60) Provisional application No. 63/355,398, filed on Jun. 24, 2022, provisional application No. 63/355,372, (Continued)

(51) Int. Cl.
*H04W 36/00* (2009.01)
(52) U.S. Cl.
CPC .............................. *H04W 36/0058* (2018.08)
(58) Field of Classification Search
CPC ............. H04W 24/10; H04W 36/0085; H04W 36/085; H04W 36/08; H04W 36/0058; H04W 36/0061; H04W 36/0072; H04W 36/00837; H04W 36/00; H04W 36/0016; H04W 36/0088; H04W 36/362; H04W 36/00725; H04W 36/0069; H04W 36/30; H04W 24/08; H04W 36/00692
See application file for complete search history.

(56) References Cited

U.S. PATENT DOCUMENTS 10,925,116 B2    2/2021  Zhang et al.
2019/0132778 A1*  5/2019  Park ................... H04W 36/0085
(Continued)

FOREIGN PATENT DOCUMENTS

WO        2020122796 A1    6/2020

OTHER PUBLICATIONS

International Search Report and Written Opinion issued Feb. 2, 2023 regarding International Application No. PCT/KR2022/016495, 7 pages.

(Continued)

*Primary Examiner* — Quoc Thai N Vu

(57) ABSTRACT

Methods and apparatuses for L1/L2 mobility control in a wireless communication system. A method of a UE comprises receiving, from a BS, a message including L1/L2 mobility configuration information. The method includes measuring, based on a CSI-RS received from at least one candidate cell of candidate BS, L1-reference signal received power (L1-RSRP), L1-reference signal received quality (L1-RSRQ), and L1-signal to interference and noise ratio (L1-SINR) of the at least one candidate cell. The method includes reporting the L1-RSRP, the L1-RSRQ, and the L1-SINR of the at least one candidate cell. The method further includes receiving an L1/L2 signal to trigger a handover (HO) operation to the target cell, wherein the L1/L2 signal includes a transmission configuration indicator (TCI) state switch to the target cell.

20 Claims, 14 Drawing Sheets

Related U.S. Application Data filed on Jun. 24, 2022, provisional application No. 63/331,079, filed on Apr. 14, 2022, provisional application No. 63/272,541, filed on Oct. 27, 2021.

(56) References Cited

U.S. PATENT DOCUMENTS

| | | | |
|---|---|---|---|
| 2019/0297537 A1* | 9/2019 | Tsai | H04W 36/0077 |
| 2020/0187069 A1 | 6/2020 | Hong et al. | |
| 2024/0022925 A1* | 1/2024 | Da Silva | H04W 24/02 |
| 2024/0137176 A1* | 4/2024 | Matsumura | H04L 5/0091 |

OTHER PUBLICATIONS

Samsung, "Impact to RRM requirements for further enhancements on MIMO", R4-2113307, 3GPP TSG RAN WG4 Meeting #100-e, Aug. 2021, 8 pages.

Oppo, "Discussion on LS Reply on TCI State Update for L1/L2-Centric Inter-Cell Mobility", R1-2107283, 3GPP TSG RAN WG1 Meeting #106-e, Aug. 2021, 3 pages.

Mediatek Inc., "Enhancement on multi-beam operation", R1-2109543, 3GPP TSG RAN WG1 #106bis-e, Oct. 2021, 27 pages.

Mediatek Inc., "Discussion on general and RRM requirements impacts in R17 feMIMO", R4-2112530, 3GPP TSG RAN WG4 Meeting #100-e, Aug. 2021, 3 pages.

"3rd Generation Partnership Project; Technical Specification Group Radio Access Network; NR; Medium Access Control (MAC) protocol specification (Release 17)", 3GPP TS 38.321 V17.0.0, Mar. 2022, 221 pages.

"3rd Generation Partnership Project; Technical Specification Group Radio Access Network; NR; Radio Resource Control (RRC) protocol specification (Release 17)", 3GPP TS 38.331 V17.0.0, Mar. 2022, 1221 pages.

Extended European Search Report issued Dec. 11, 2024 regarding Application No. 22887619.9, 10 pages.

* cited by examiner

600

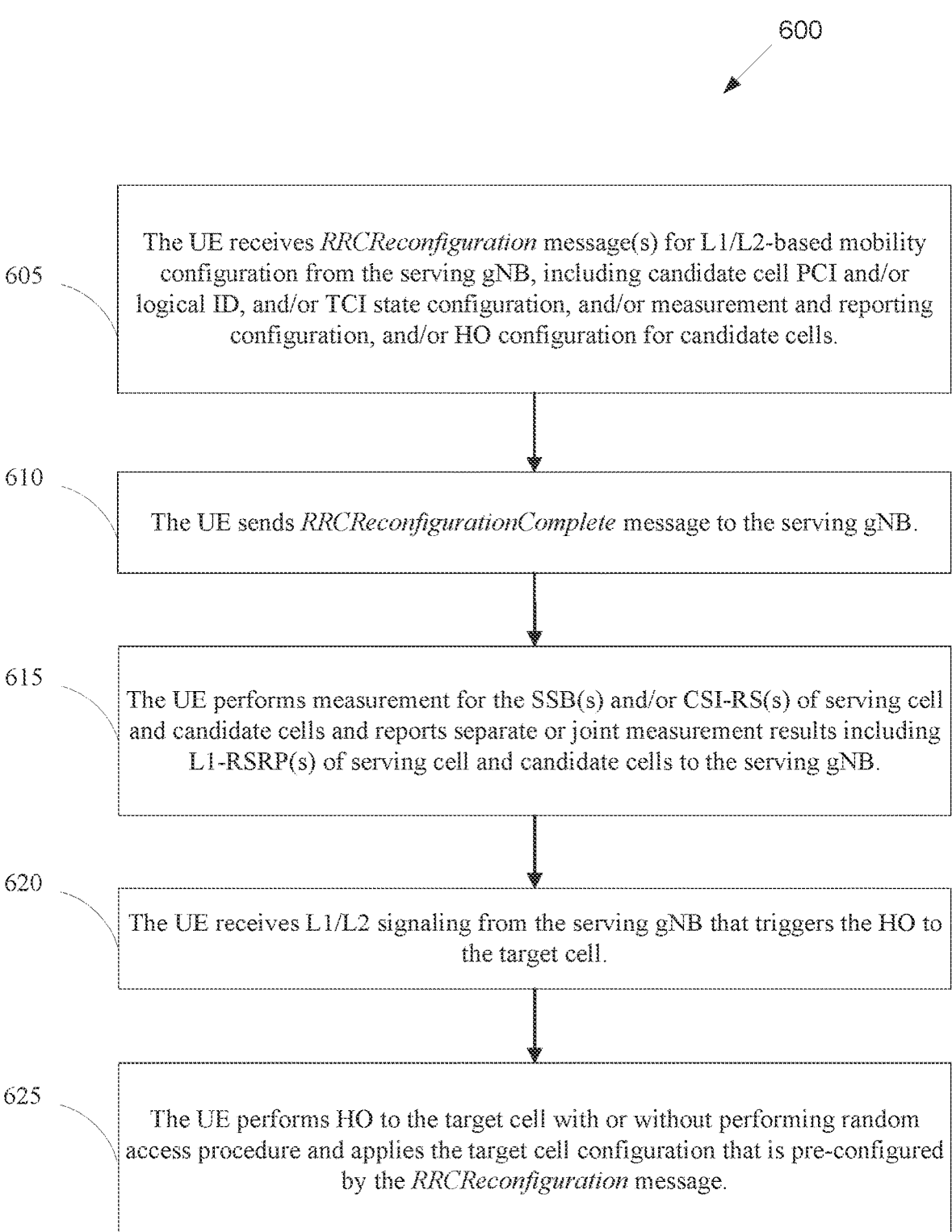

605 — The UE receives *RRCReconfiguration* message(s) for L1/L2-based mobility configuration from the serving gNB, including candidate cell PCI and/or logical ID, and/or TCI state configuration, and/or measurement and reporting configuration, and/or HO configuration for candidate cells.

610 — The UE sends *RRCReconfigurationComplete* message to the serving gNB.

615 — The UE performs measurement for the SSB(s) and/or CSI-RS(s) of serving cell and candidate cells and reports separate or joint measurement results including L1-RSRP(s) of serving cell and candidate cells to the serving gNB.

620 — The UE receives L1/L2 signaling from the serving gNB that triggers the HO to the target cell.

625 — The UE performs HO to the target cell with or without performing random access procedure and applies the target cell configuration that is pre-configured by the *RRCReconfiguration* message.

FIG. 6

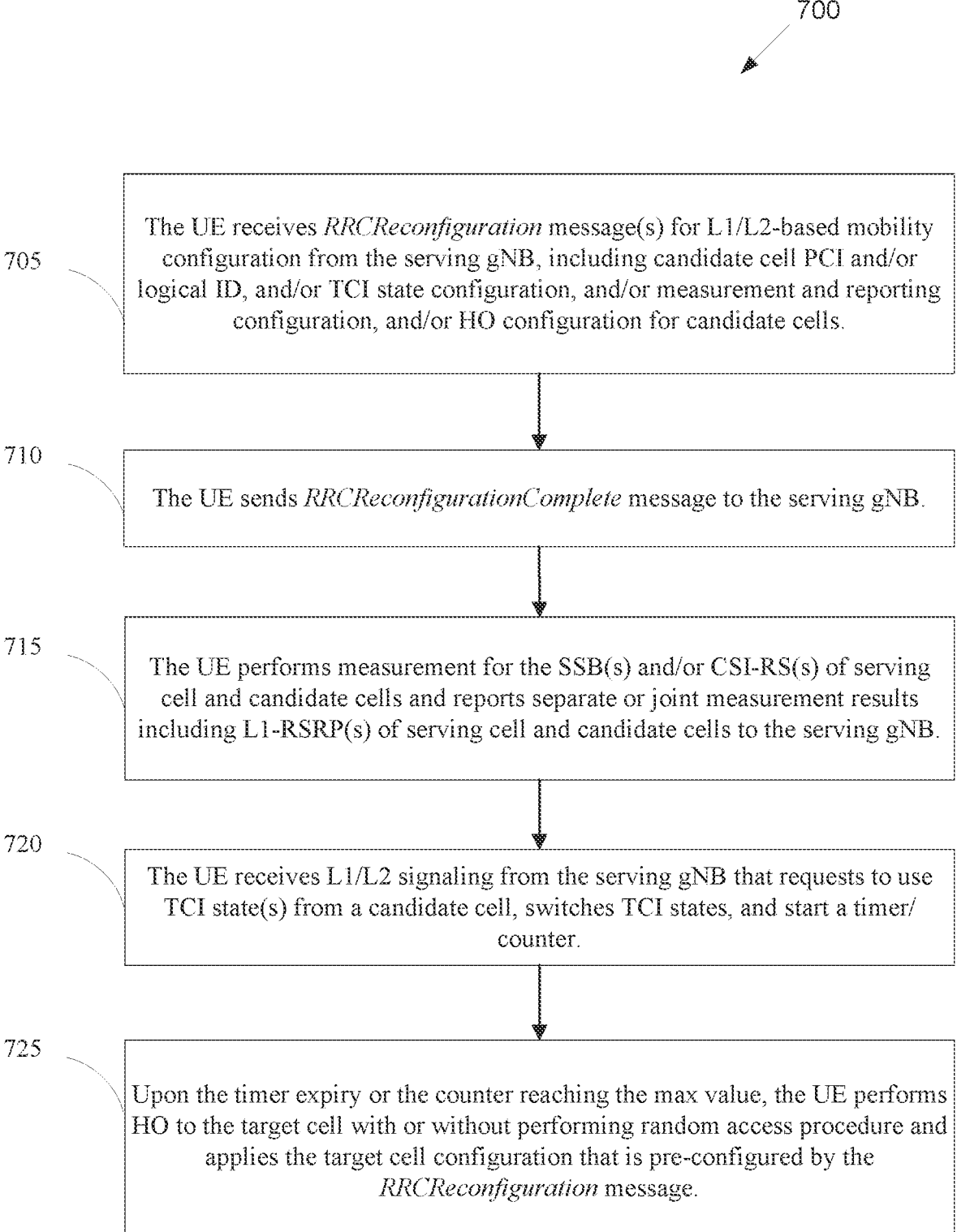

700

705 — The UE receives *RRCReconfiguration* message(s) for L1/L2-based mobility configuration from the serving gNB, including candidate cell PCI and/or logical ID, and/or TCI state configuration, and/or measurement and reporting configuration, and/or HO configuration for candidate cells.

710 — The UE sends *RRCReconfigurationComplete* message to the serving gNB.

715 — The UE performs measurement for the SSB(s) and/or CSI-RS(s) of serving cell and candidate cells and reports separate or joint measurement results including L1-RSRP(s) of serving cell and candidate cells to the serving gNB.

720 — The UE receives L1/L2 signaling from the serving gNB that requests to use TCI state(s) from a candidate cell, switches TCI states, and start a timer/counter.

725 — Upon the timer expiry or the counter reaching the max value, the UE performs HO to the target cell with or without performing random access procedure and applies the target cell configuration that is pre-configured by the *RRCReconfiguration* message.

FIG. 7

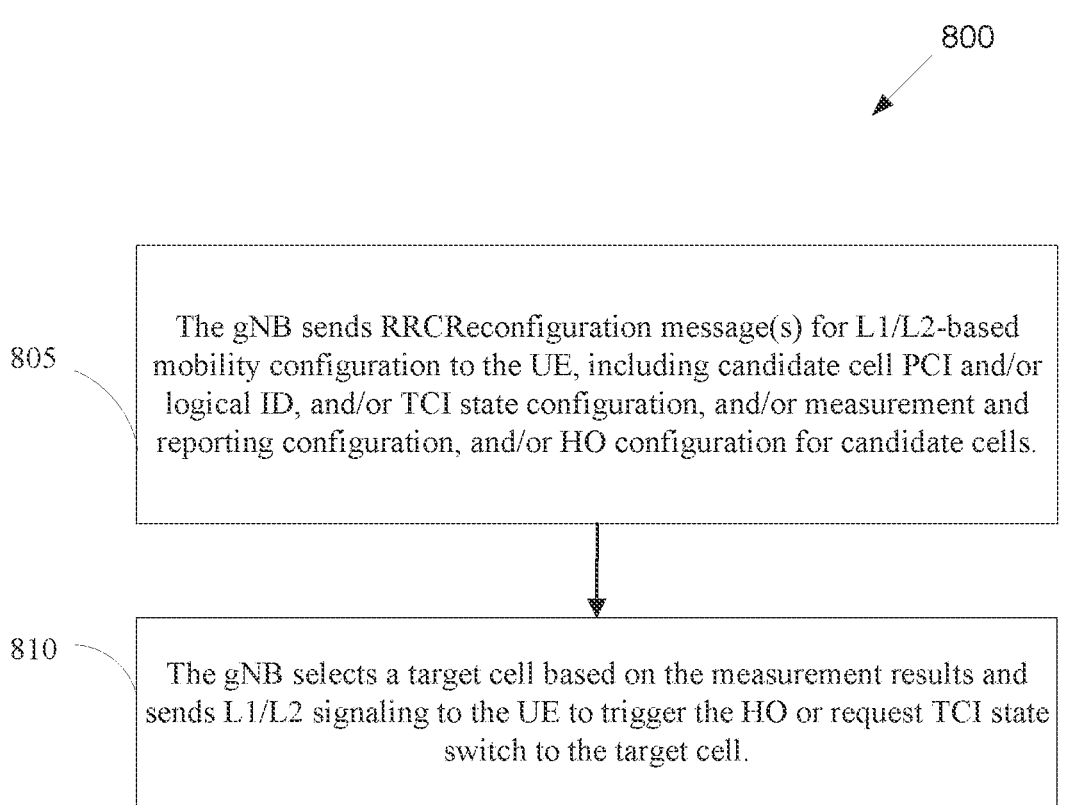

800

805

The gNB sends RRCReconfiguration message(s) for L1/L2-based mobility configuration to the UE, including candidate cell PCI and/or logical ID, and/or TCI state configuration, and/or measurement and reporting configuration, and/or HO configuration for candidate cells.

810

The gNB selects a target cell based on the measurement results and sends L1/L2 signaling to the UE to trigger the HO or request TCI state switch to the target cell.

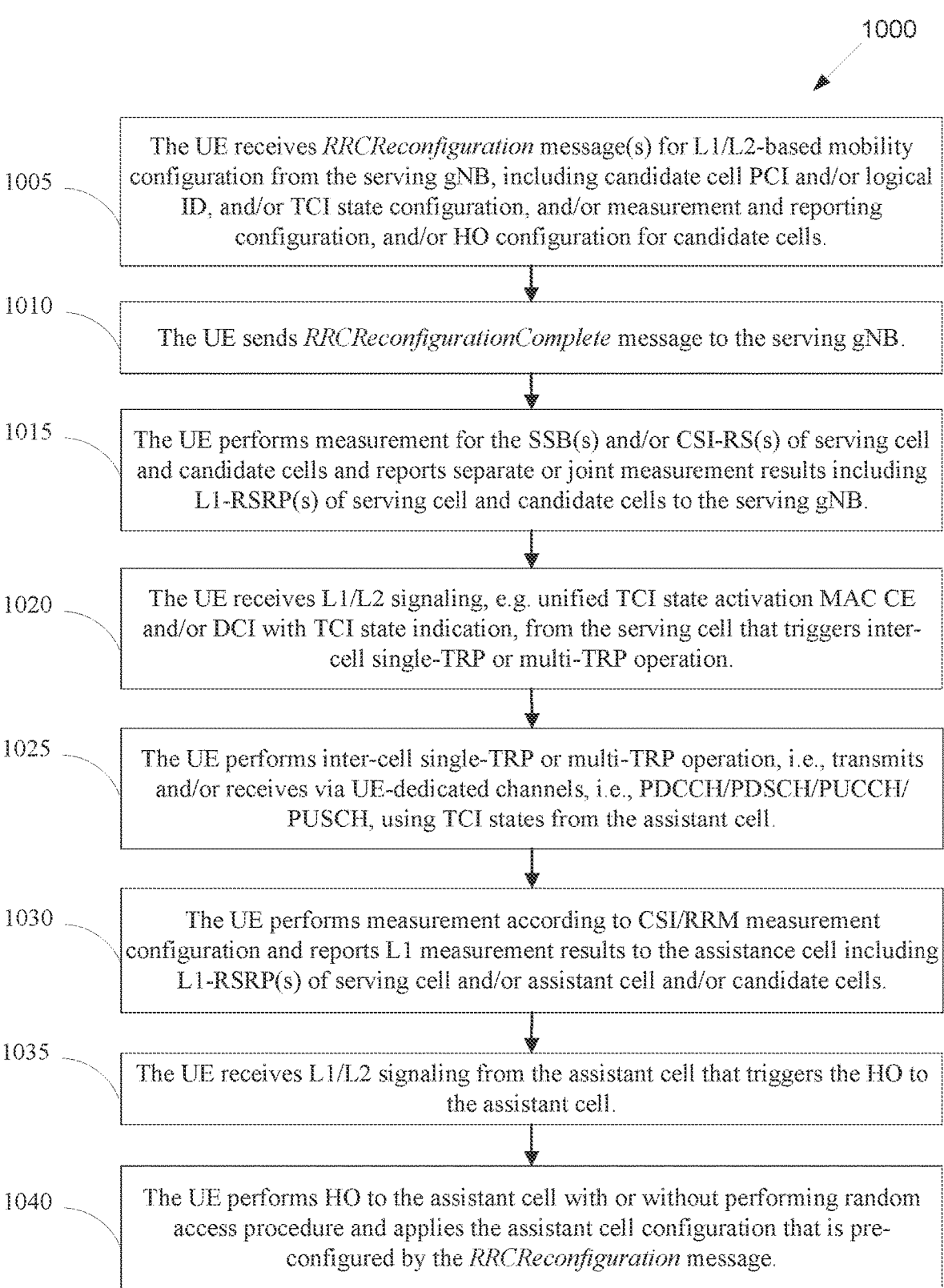

1005 — The UE receives *RRCReconfiguration* message(s) for L1/L2-based mobility configuration from the serving gNB, including candidate cell PCI and/or logical ID, and/or TCI state configuration, and/or measurement and reporting configuration, and/or HO configuration for candidate cells.

1010 — The UE sends *RRCReconfigurationComplete* message to the serving gNB.

1015 — The UE performs measurement for the SSB(s) and/or CSI-RS(s) of serving cell and candidate cells and reports separate or joint measurement results including L1-RSRP(s) of serving cell and candidate cells to the serving gNB.

1020 — The UE receives L1/L2 signaling, e.g. unified TCI state activation MAC CE and/or DCI with TCI state indication, from the serving cell that triggers inter-cell single-TRP or multi-TRP operation.

1025 — The UE performs inter-cell single-TRP or multi-TRP operation, i.e., transmits and/or receives via UE-dedicated channels, i.e., PDCCH/PDSCH/PUCCH/ PUSCH, using TCI states from the assistant cell.

1030 — The UE performs measurement according to CSI/RRM measurement configuration and reports L1 measurement results to the assistance cell including L1-RSRP(s) of serving cell and/or assistant cell and/or candidate cells.

1035 — The UE receives L1/L2 signaling from the assistant cell that triggers the HO to the assistant cell.

1040 — The UE performs HO to the assistant cell with or without performing random access procedure and applies the assistant cell configuration that is pre-configured by the *RRCReconfiguration* message.

FIG. 10

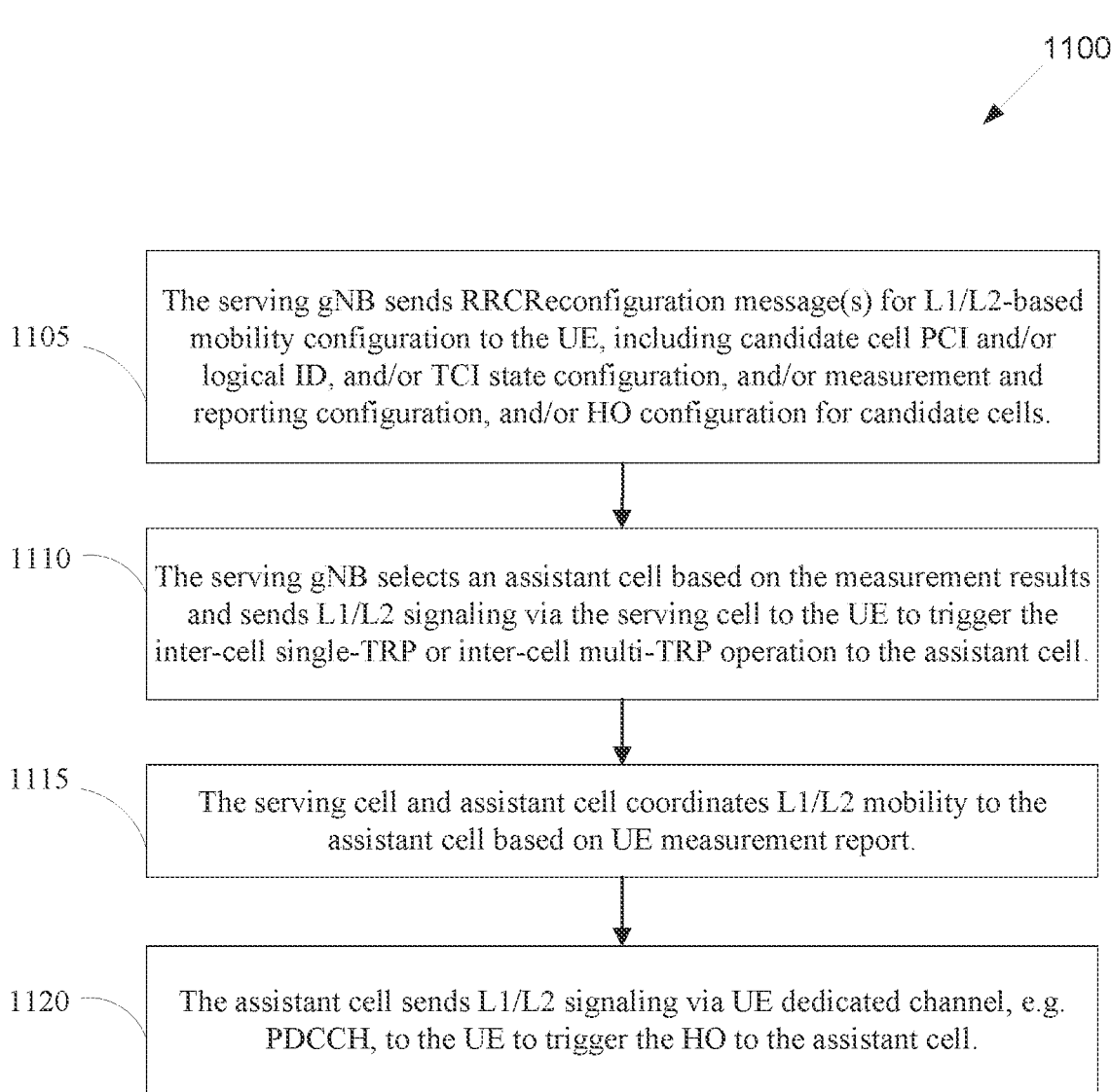

1100

1105 — The serving gNB sends RRCReconfiguration message(s) for L1/L2-based mobility configuration to the UE, including candidate cell PCI and/or logical ID, and/or TCI state configuration, and/or measurement and reporting configuration, and/or HO configuration for candidate cells.

1110 — The serving gNB selects an assistant cell based on the measurement results and sends L1/L2 signaling via the serving cell to the UE to trigger the inter-cell single-TRP or inter-cell multi-TRP operation to the assistant cell.

1115 — The serving cell and assistant cell coordinates L1/L2 mobility to the assistant cell based on UE measurement report.

1120 — The assistant cell sends L1/L2 signaling via UE dedicated channel, e.g. PDCCH, to the UE to trigger the HO to the assistant cell.

FIG. 11

METHOD AND APPARATUS FOR L1/L2-BASED INTER-CELL MOBILITY

CROSS-REFERENCE TO RELATED APPLICATIONS AND CLAIM OF PRIORITY

The present application claims priority to:
U.S. Provisional Patent Application No. 63/272,541, filed on Oct. 27, 2021;
U.S. Provisional Patent Application No. 63/331,079, filed on Apr. 14, 2022;
U.S. Provisional Patent Application No. 63/355,372, filed on Jun. 24, 2022; and
U.S. Provisional Patent Application No. 63/355,398, filed on Jun. 24, 2022. The contents of the above-identified patent documents are incorporated herein by reference.

TECHNICAL FIELD

The present disclosure relates generally to wireless communication systems and, more specifically, the present disclosure relates to a layer 1/layer 2 (L1/L2)-based inter-cell mobility in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to an L1/ L2-based inter-cell mobility in a wireless communication system.

In one embodiment, a user equipment (UE) in a wireless communication system provided. The UE comprises a transceiver configured to receive, from a serving base station (BS), a message including layer 1/layer 2 (L1/L2) mobility configuration information. The UE further comprises a processor operably coupled to the transceiver, the processor configured to: measure, based on a channel status information-reference signal (CSI-RS) received from at least one candidate cell of candidate BS, L1-reference signal received power (L1-RSRP), L1-reference signal received quality (L1-RSRQ), and L1-signal to interference and noise ratio (L1-SINR) of the at least one candidate cell. The transceiver of the UE is further configured to: report the L1-RSRP, the L1-RSRQ, and the L1-SINR of the at least one candidate cell, and receive an L1/L2 signal to trigger a handover (HO) operation to a target cell, the L1/L2 signal including a transmission configuration indicator (TCI) state switch to the target cell.

In another embodiment, a BS in a wireless communication system is provided. The BS comprises a processor configured to generate a message including L1/L2 mobility configuration information. The BS further comprises a transceiver operably connected to the processor, the transceiver configured to: transmit, to a UE, the message including the L1/L2 mobility configuration information, receive, from the UE, a report including L1-RSRP, L1-RSRQ, and L1-SINR of at least one candidate cell, wherein the L1-RSRP, the L1-RSRQ and the L1-SINR are based on a CSI-RS corresponding to the least one candidate cell of candidate BS, and transmit a L1/L2 signal to the UE for triggering a HO operation to a target cell, including a TCI state switch to the target cell.

In yet another embodiment, a method of a UE in a wireless communication system is provided. The method comprises: receiving, from a BS, a message including L1/L2 mobility configuration information; measuring, based on a CSI-RS received from at least one candidate cell of candidate BS, L1-RSRP, L1-RSRQ, and L1-SINR of the at least one candidate cell; reporting the L1-RSRP, the L1-RSRQ, and the L1-SINR of the at least one candidate cell; receiving an L1/L2 signal to trigger a HO operation to the target cell, wherein the L1/L2 signal includes a TCI state switch to the target cell.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates a flowchart of method for a UE behavior in L1/L2-based mobility procedure without timer to trigger according to embodiments of the present disclosure;

FIG. 7 illustrates a flowchart of method for a UE behavior in L1/L2-based mobility procedure with timer to trigger according to embodiments of the present disclosure;

FIG. 8 illustrates a flowchart of method for a gNB behavior in L1/L2-based mobility procedure according to embodiments of the present disclosure;

FIG. 10 illustrates a flowchart of method for a UE behavior in an L1/L2-based mobility procedure with inter-cell single-/multi-TRP operation according to embodiments of the present disclosure;

FIG. 11 illustrates a flowchart of method for a gNB behavior in an L1/L2-based mobility procedure with inter-cell single-/multi-TRP operation according to embodiments of the present disclosure;

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.321 v17.0.0, "NR; Medium Access Control (MAC) protocol specification"; and 3GPP TS 38.331 v17.0.0, "NR; Radio Resource Control (RRC) Protocol Specification."

Figure 1:
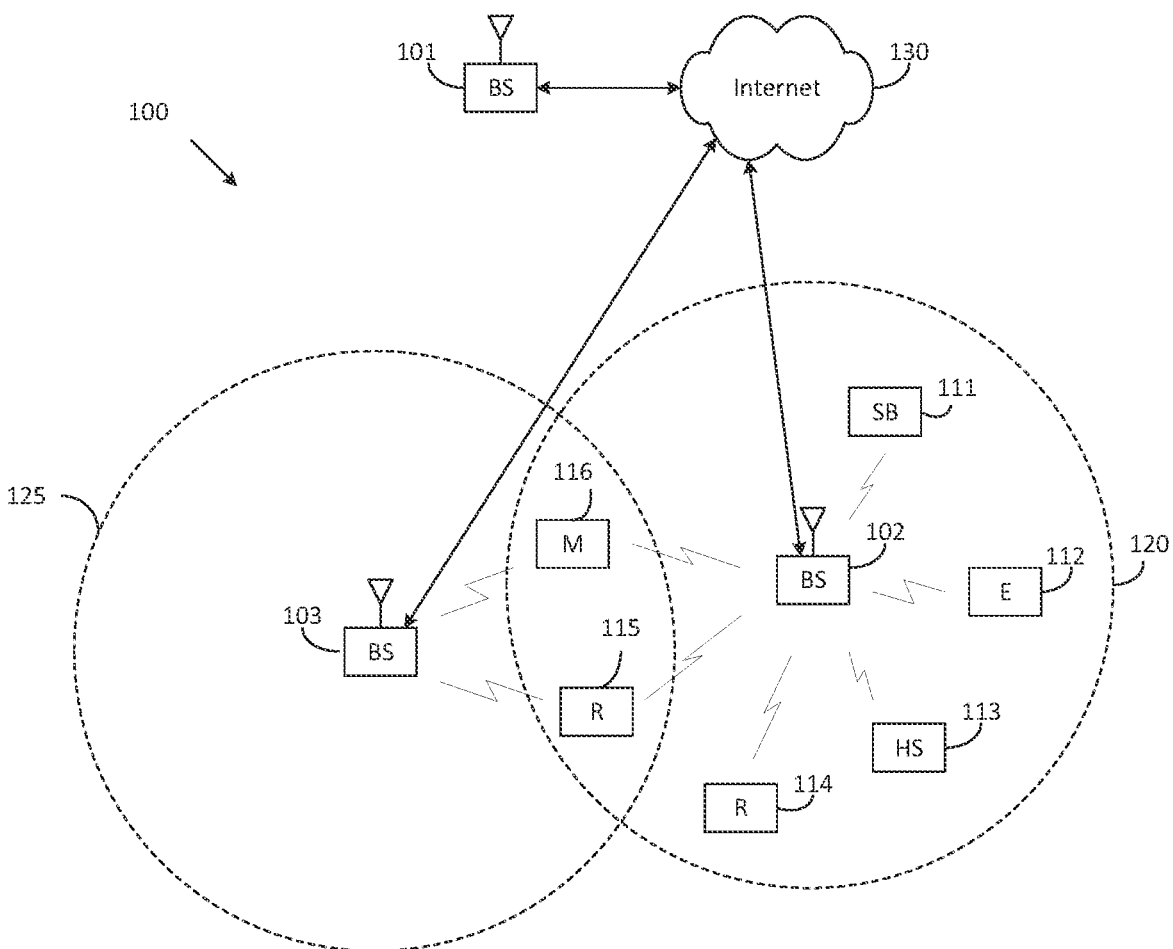
FIG. 1 illustrates an example of wireless network according to embodiments of the present disclosure.
Figure 2:
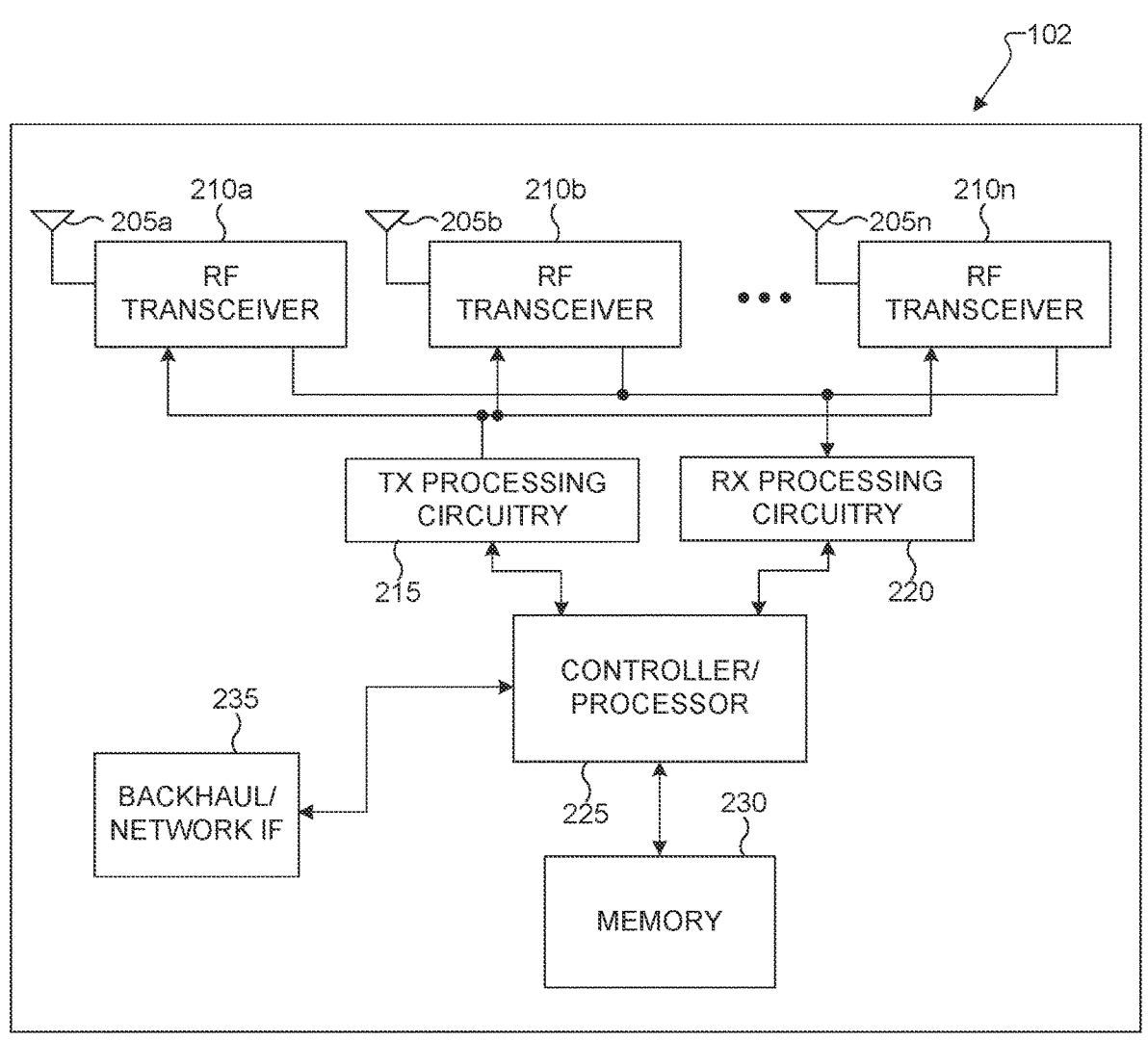
FIG. 2 illustrates an example of gNB according to embodiments of the present disclosure.
Figure 3:
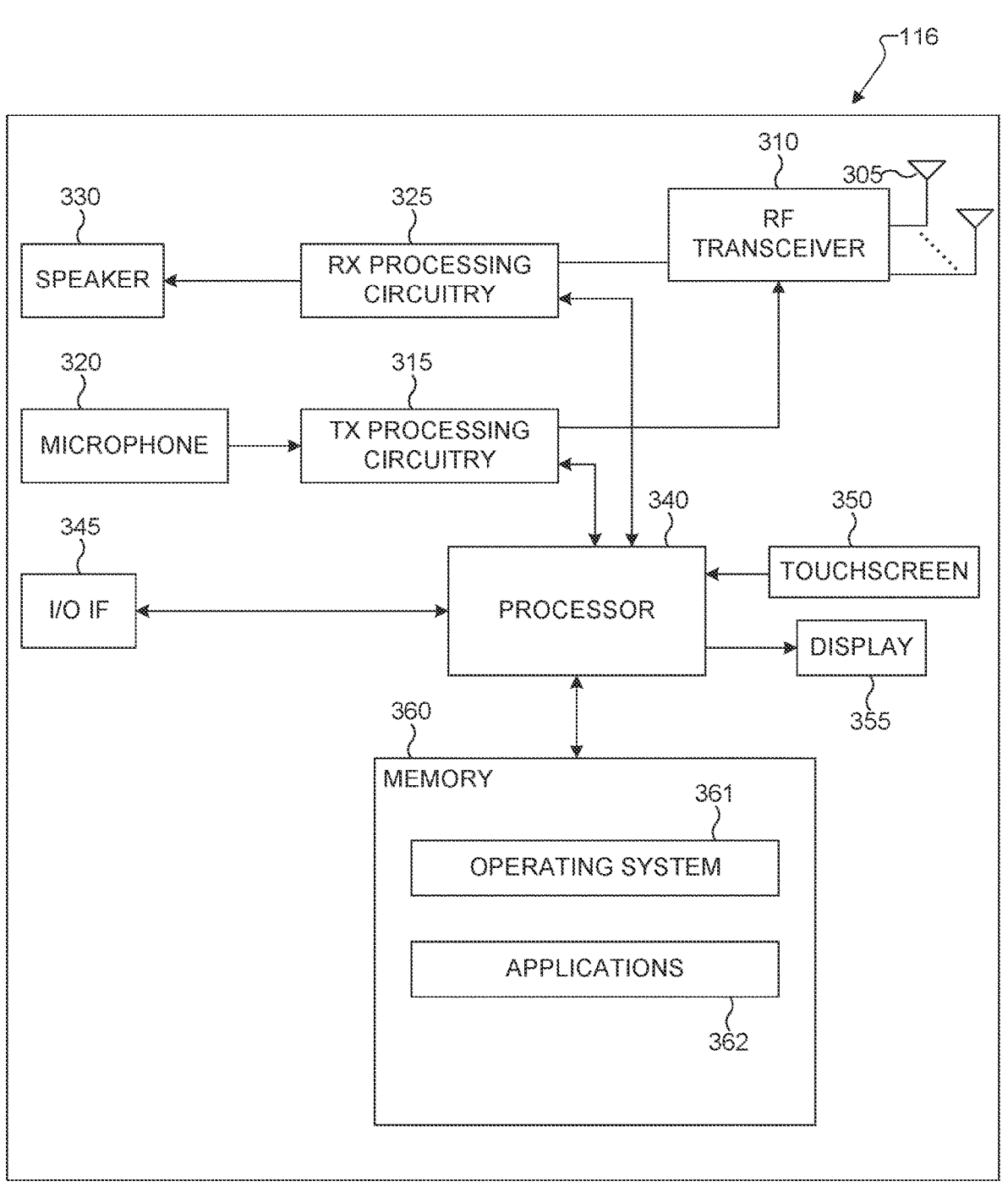
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNB s 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, an L1/L2-based inter-cell mobility in a wireless communication system. In certain embodiments, and one or more of the gNBs 101-103 includes circuitry, programing, or a combination thereof, for an L1/L2-based inter-cell mobility in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support an L1/L2-based inter-cell mobility in a wireless communication system. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for an L1/L2-based inter-cell mobility in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figures 4, 5:
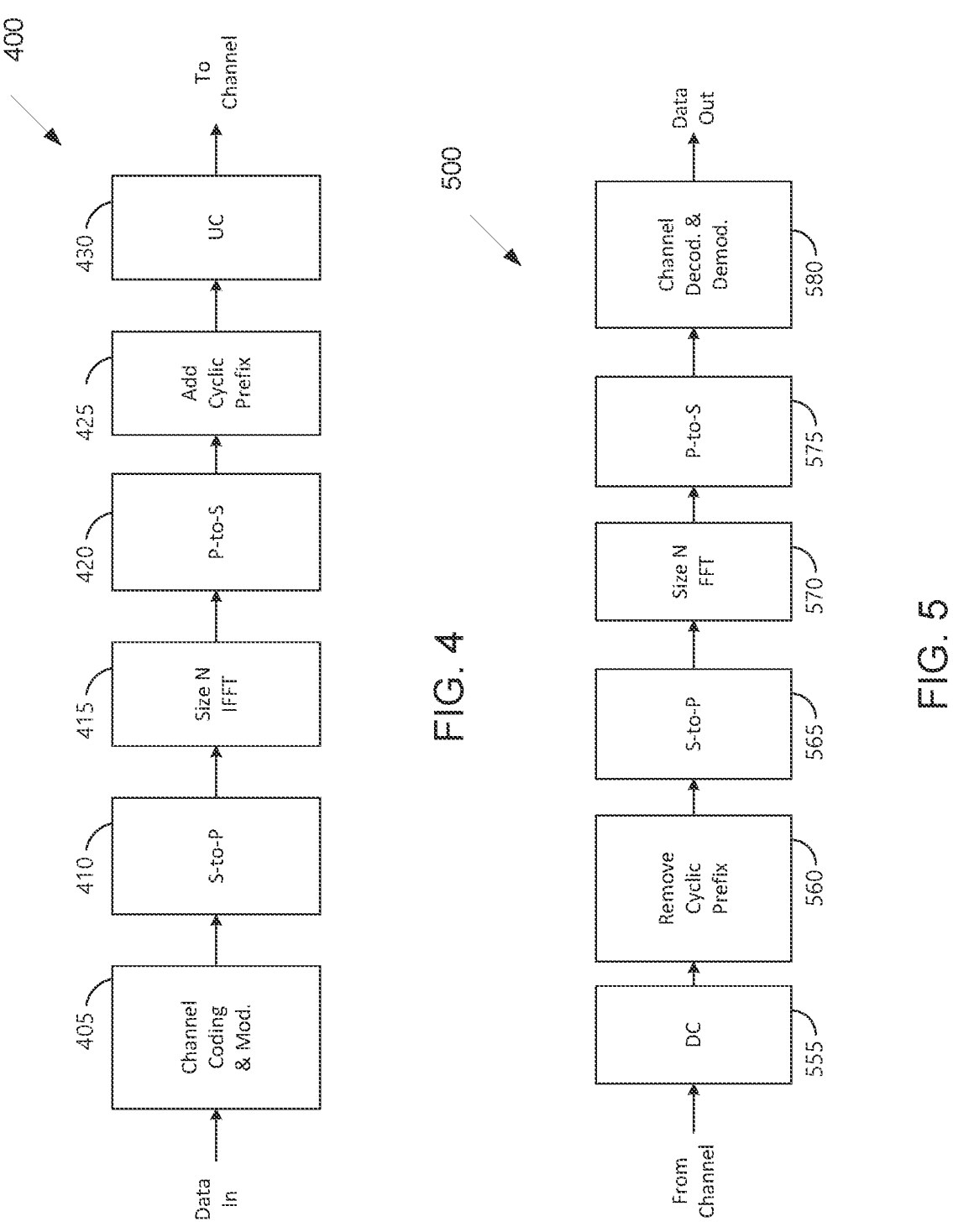
FIGS. 4 and 5 illustrate example of wireless transmit and receive paths according to this disclosure.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as demultiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

The 3GPP has developed technical specifications and standards to define the new 5G radio-access technology, known as 5G NR. Mobility handling is a critical aspect in any mobile communication system including 5G system. For a UE in a connected mode, mobility is controlled by the network with the assistance from the UE to maintain a good quality of connection. Based on the measurement on radio link quality of the serving cell and neighboring cell(s) reported by the UE, the network may hand over the UE to a neighboring cell that can provide better radio conditions when the UE is experiencing a degraded connection to the serving cell. In release-15 NR, the basic mechanism and procedure of network-controlled mobility in connected mode is developed. In release-16 NR, enhancements to network-controlled mobility in connected mode are introduced to mitigate connection interruption during handover procedure. Specifically, two enhanced handover mechanisms are developed, known as conditional handover (CHO) and dual active protocol stack (DAPS).

For mobility in a connected mode, the handover is initiated by the network via a higher layer signaling, e.g., an RRC message, based on layer 3 (L3) measurements. However, this procedure involves more latency, signaling overhead and interruption time that may become the key issue in some scenarios with frequent handover, e.g., a UE in high-speed vehicular and in FR2 deployment. Reduction on overhead and/or latency and interruption time in handover procedure is necessary. This brings the need of L1/L2 (Layer 1/Layer 2) inter-cell mobility, by which handover can be triggered by L1/L2 signaling based on L1 measurement. More specifically, L1/L2 based inter-cell mobility refers to a network-controlled mobility mechanism that hands over a UE from the source cell to a target cell via inter-cell beam switching triggered by L1/L2 signaling, where the beam switching decision is based on L1 measurement on beams among neighboring cells.

To reduce signaling overhead and interruption time in network-controlled mobility, the procedure for L1/L2-based inter-cell mobility is desired to be designed.

In this disclosure, an L1/L2-based inter-cell mobility procedure is provided. Specifically, handover procedures with and without random access for L1/L2-based inter-cell mobility are provided. RRC configuration is specified.

In this disclosure, L1/L2-based inter-cell mobility signaling is provided. Specifically, an L1/L2 signaling for beam switching triggered inter-cell mobility is provided.

FIG. 6 illustrates a flowchart of method 600 for a UE behavior in L1/L2-based mobility procedure without timer to trigger according to embodiments of the present disclosure. The method 600 as may be performed by a UE (e.g., 111-116 as illustrated in FIG. 1). An embodiment of the method 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions.

For one embodiment, the L1/L2-based inter-cell mobility procedure is illustrated in FIG. 6 for the behavior of the UE. As illustrated in FIG. 6, in method 600, the UE performs the L1/L2-based handover (HO) procedure without timer to trigger. At operation 605, the UE receives RRCReconfiguration message(s) for L1/L2-based mobility configuration from the serving gNB, including candidate cell PCI and/or logical ID, and/or transmission configuration indicator (TCI) state configuration, and/or measurement and reporting configuration, and/or HO configuration for candidate cells. At operation 610, the UE sends RRCReconfigurationComplete message to the serving gNB. At operation 615, the UE performs measurement for the SSB(s) and/or CSI-RS(s) of serving cell and candidate cells and reports separate or joint measurement results including L1-RSRP(s), L1-RSRQ, and L1-SINR of serving cell and candidate cells to the serving gNB. At operation 620, the UE receives L1/L2 signaling from the serving gNB that triggers the HO to the target cell. At operation 625, the UE performs HO to the target cell with or without performing random access procedure and applies the target cell configuration that is pre-configured by the RRCReconfiguration message.

FIG. 7 illustrates a flowchart of method 700 for a UE behavior in L1/L2-based mobility procedure with timer to trigger according to embodiments of the present disclosure. The method 700 as may be performed by a UE (e.g., 111-116 as illustrated in FIG. 1). An embodiment of the method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

For another embodiment, an L1/L2-based mobility procedure is performed with timer to trigger, as shown in FIG.

7. The UE can perform handover if certain conditions are fulfilled after receiving L1/L2 signaling. In method 700, the UE can trigger the handover with or without an explicit HO request if from the time the UE receives the first TCI state switch instructing the UE to transmit/receive via a beam from a candidate cell the UE has been using TCI states from that candidate cell for a duration no less than a threshold configured by the network or for at least N TCI state switch indications instructing the UE to transmit/receive via beam (s) from a candidate cell.

The network can configure a timer duration or a max counter value in the RRCReconfiguration message (705). The UE accordingly starts a timer upon receiving TCI state switch indication that requests the UE to transmit/receive via a beam from a candidate cell (720). The UE restarts the timer when the UE receives the TCI state switch instructing the UE to transmit/receive via a beam from a different candidate cell, and the UE stops the timer when the UE receives the TCI state switch instructing the UE to transmit/receive via a beam from the serving cell. At the expiry of the timer for a certain candidate cell, the UE may trigger handover to that cell, i.e., perform random access procedure or RACH-less access and apply target cell RRC configuration (725).

Alternatively, the UE sets a counter upon receiving a TCI state switch instructing the UE to transmit/receive via a beam from a candidate cell (720). The counter is increased by 1 when the UE receives the TCI state switch instructing the UE to transmit/receive via a beam from that candidate cell. When the counter reaches the max value for a certain candidate cell, the UE may trigger handover to that cell, i.e., perform random access procedure or RACH-less access and apply target cell RRC configuration (725).

FIG. 8 illustrates a flowchart of method 800 for a gNB behavior in L1/L2-based mobility procedure according to embodiments of the present disclosure. The method 800 as may be performed by a BS (e.g., 101-103 as illustrated in FIG. 1). An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

In FIG. 8, the gNB conducts the L1/L2-based HO mechanism. At operation 805, the gNB sends RRCReconfiguration message(s) for L1/L2-based mobility configuration to the UE, including candidate cell PCI and/or logical ID, and/or TCI state configuration, and/or measurement and reporting configuration, and/or HO configuration for candidate cells. At operation 810, the gNB selects a target cell based on the measurement results and sends L1/L2 signaling to the UE to trigger the HO or request TCI state switch to the target cell.

Figure 9:
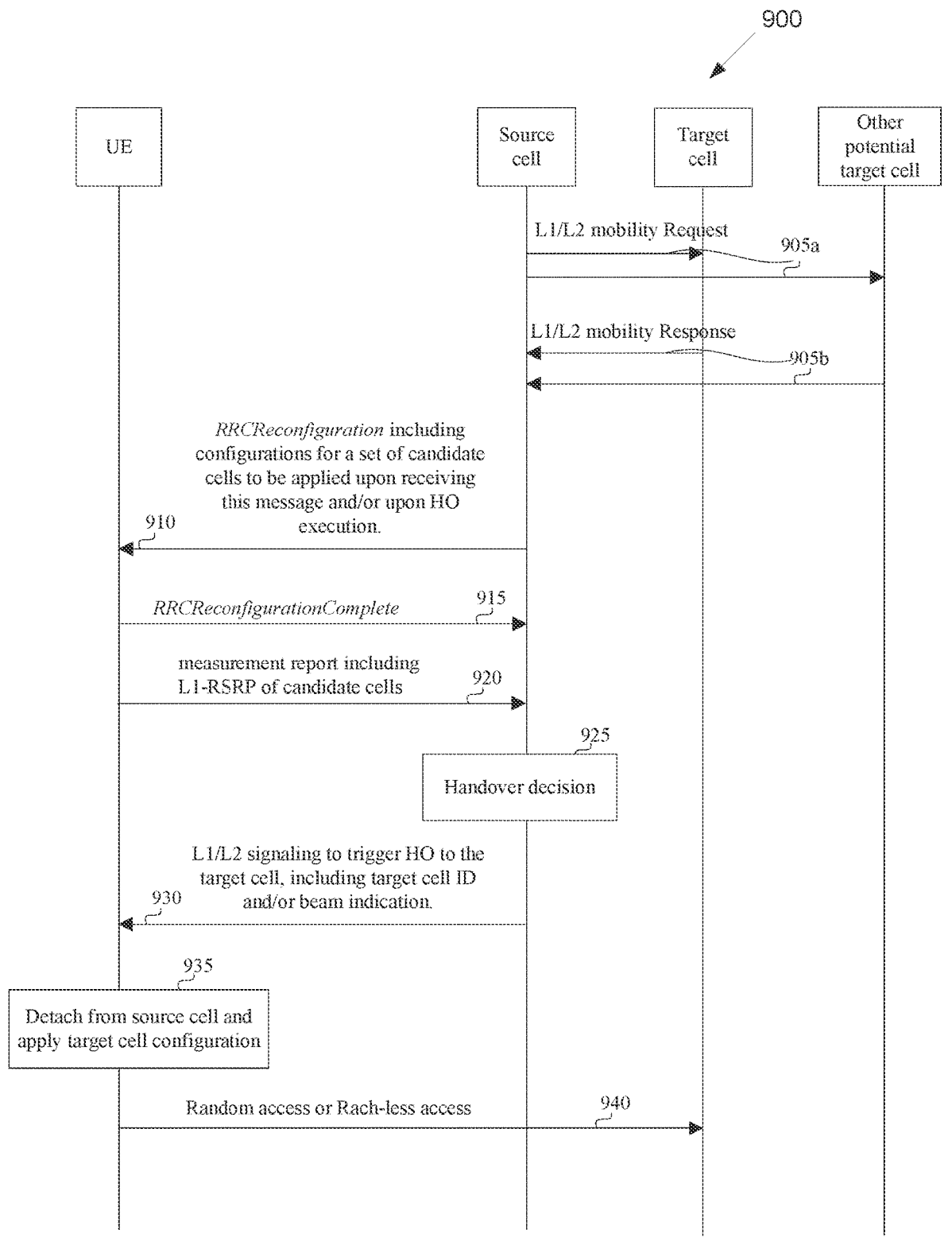
FIG. 9 illustrates a signaling flow for an L1/L2 inter-cell mobility procedure according to embodiments of the present disclosure.

FIG. 9 illustrates a signaling flow 900 for an L1/L2 inter-cell mobility procedure according to embodiments of the present disclosure. The signaling flow 900 as may be performed by a UE (e.g., 111-116 as illustrated in FIG. 1) and a BS (e.g., 101-103 as illustrated in FIG. 1). An embodiment of the signaling flow 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

FIG. 9 illustrates the signaling flow corresponding to the UE and gNB behavior in FIG. 6, FIG. 7, and FIG. 8. At 905, the source cell and candidate cells exchange messages for intra-DU interface and/or inter-DU intra-CU L1/L2 mobility preparation. The source cell sends L1/L2 mobility Request messages to ask for L1/L2 mobility support from the candidate cells (905a) and candidate cells reply L1/L2 mobility Response messages to confirm or reject L1/L2 mobility, and/or include configuration information in the response messages (905b).

At 910, the source cell sends RRCReconfiguration message(s) including the configurations for a set of candidate cells. Some of the configurations are to be applied upon UE receiving this RRC message, e.g., a measurement and reporting configuration and TCI state configuration for candidate cells which can according to Release-15/16 specifications or the unified TCI framework in Release-17 specifications, and the rest are to be applied upon handover execution, e.g., information required for random access to the target cell. The UE replies with RRCReconfiguration-Complete (915).

According to the measurement and reporting configuration, the UE performs measurement for the candidate cells and reports the measurement results, e.g., L1-RSRP, L1-RSRQ, and L1-SINR values of candidate cells (920). Based on the measurement report, the source cell decides a target cell and one or more associated TCI states to hand over the UE (925). By L1/L2 signaling to a UE, e.g., sending a MAC CE and/or DCI indicating the target cell ID and/or TCI state to switch to, the source cell initiates the HO (930).

After receiving the HO trigger command via L1/L2 signaling, the UE detaches from the source cell, applies the stored configuration for the target cell, e.g., upon switching to the TCI state associated with the target cell or at the configured time instance (935). The UE accesses the target cell via random access (940), following a contention-free random access (CFRA) procedure if a dedicated random access channel (RACH) preamble is indicated in an RRCReconfiguration message at 810, or following a contention-based random access (CBRA) procedure if no dedicated preamble is indicated, or the UE accesses the target cell without performing the random access procedure if an RACH-less access is indicated in an RRCReconfiguration message at 910 or in the L1/L2 signaling at 830 and sends C-RNTI MAC CE to the target cell to confirm the handover completion (940).

FIG. 10 illustrates a flowchart of method 1000 for a UE behavior in an L1/L2-based mobility procedure with inter-cell single-/multi-TRP operation according to embodiments of the present disclosure. The method 1000 as may be performed by a UE (e.g., 111-116 as illustrated in FIG. 1). An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

In one more embodiment, a UE can perform an inter-cell single-TRP or inter-cell multi-TRP operation on the target cell and then perform the L1/L2-based handover which is triggered by a HO command from the target cell. As shown in FIG. 10, at operation 1005, the UE receives RRCReconfiguration message(s) for L1/L2-based mobility configuration from the serving gNB, including candidate cell PCI and/or logical ID, and/or transmission configuration indicator (TCI) state configuration, and/or measurement and reporting configuration, and/or HO configuration for candidate cells.

At operation 1010, the UE sends an RRCReconfigura-tionComplete message to the serving gNB. At operation 1015, the UE performs measurement for the SSB(s) and/or CSI-RS(s) of serving cell and/or candidate cells and reports separate or joint measurement results including L1-RSRP (s), L1-RSRQ(s), and L1-SINR(s) of serving cell and/or candidate cells to the serving gNB. At operation 1020, the UE receives L1/L2 signaling, e.g., a unified TCI state activation MAC CE and/or DCI with TCI state indication, from the serving gNB that triggers an inter-cell single-TRP or multi-TRP operation.

At operation 1025, the UE transmits and/or receives via UE-dedicated channels, i.e., PDCCH/PDSCH/PUCCH/PUSCH, using TCI states from the cell with different PCI from the serving cell, namely assistant cell, which can be one of the candidate cells configured at operation 1005. At operation 1030, the UE performs measurement according to CSI/RRM measurement configuration and reports L1 mea-surement results including L1-RSRP(s), L1-RSRQ(s), L1-SINR(s) of serving cell and/or assistant cell and/or candidate cells to the assistance cell. At operation 1035, the UE receives L1/L2 signaling from the assistant cell that triggers the HO to the assistant cell. At operation 1040, the UE performs HO to the assistant cell with or without performing a random-access procedure and applies the assis-tant cell configuration that is pre-configured by the RRCReconfiguration message at operation 1005.

FIG. 11 illustrates a flowchart of method 1100 for a gNB behavior in an L1/L2-based mobility procedure with inter-cell single-/multi-TRP operation according to embodiments of the present disclosure. The method 1100 as may be performed by a BS (e.g., 101-103 as illustrated in FIG. 1). An embodiment of the method 1100 shown in FIG. 11 is for illustration only. One or more of the components illustrated in FIG. 11 can be implemented in specialized circuitry configured to perform the noted functions or one or more of the components can be implemented by one or more pro-cessors executing instructions to perform the noted func-tions.

In FIG. 11, the gNB conducts the L1/L2-based HO mechanism. At operation 1105, the gNB sends RRCRecon-figuration message(s) for L1/L2-based mobility configura-tion to the UE, including candidate cell PCI and/or logical ID, and/or TCI state configuration, and/or measurement and reporting configuration, and/or HO configuration for candi-date cells. At operation 1110, the gNB selects an assistant cell based on the measurement results and sends L1/L2 signaling via the serving cell to the UE to trigger the inter-cell single-TRP or inter-cell multi-TRP operation to the assistant cell. At operation 1115, the serving cell and assis-tant cell coordinates L1/L2 mobility to the assistant cell based on a UE measurement report. At operation 1120, the assistant cell sends L1/L2 signaling via a UE dedicated channel, e.g., PDCCH, to the UE to trigger the HO to the assistant cell.

Figure 12:
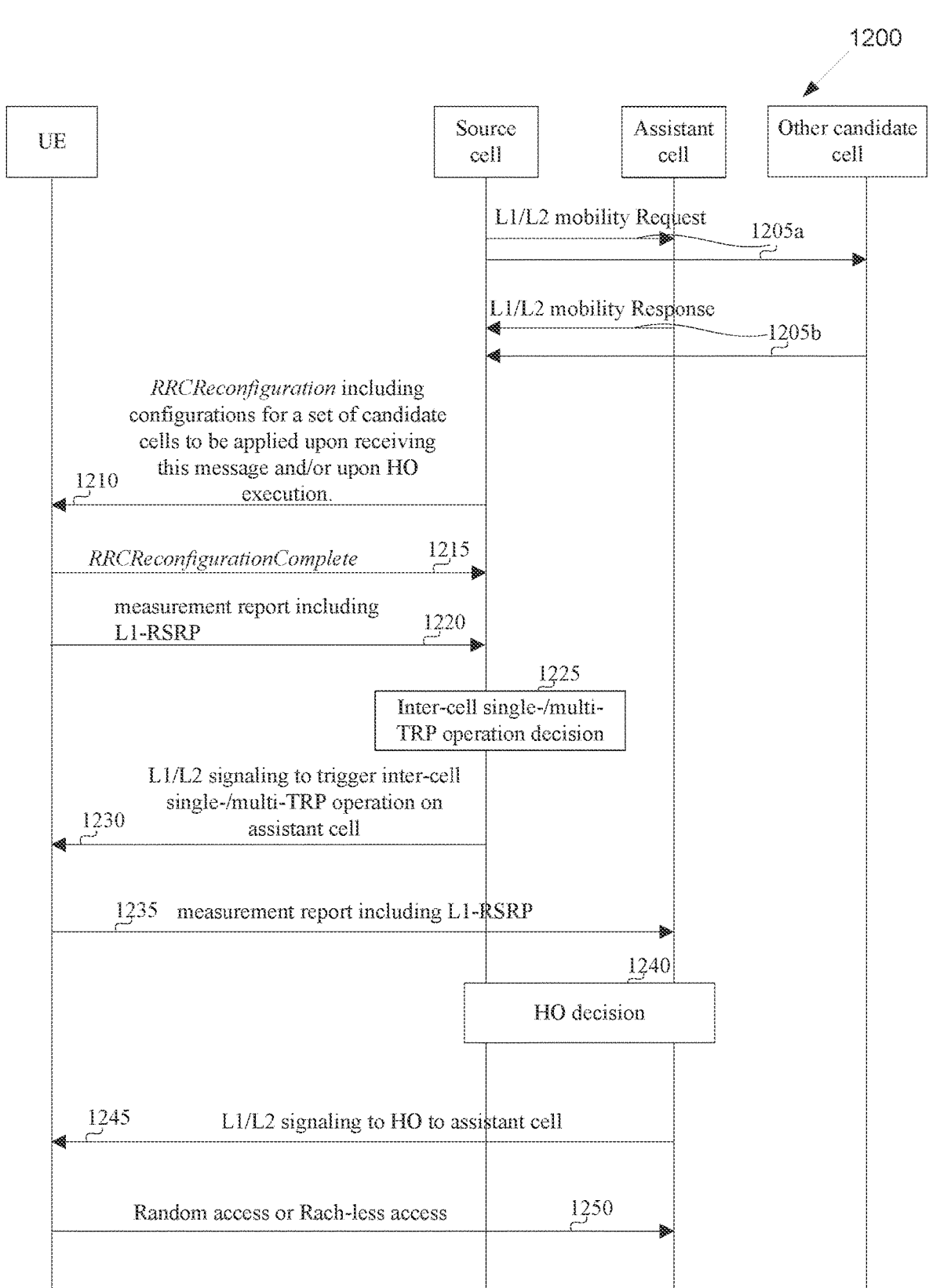
FIG. 12 illustrates a signaling flow for an L1/L2 inter-cell mobility procedure with inter-cell single-/multi-TRP operation according to embodiments of the present disclosure.

FIG. 12 illustrates a signaling flow 1200 for an L1/L2 inter-cell mobility procedure with an inter-cell single-/multi-TRP operation according to embodiments of the present disclosure. The signaling flow 1200 as may be performed by a UE (e.g., 111-116 as illustrated in FIG. 1) and a BS (e.g., 101-103 as illustrated in FIG. 1). An embodiment of the signaling flow 1200 shown in FIG. 12 is for illustration only. One or more of the components illustrated in FIG. 12 can be implemented in specialized circuitry configured to perform the noted functions or one or more of the components can be implemented by one or more processors executing instruc-tions to perform the noted functions.

FIG. 12 illustrates the signaling flow corresponding to the UE and gNB behavior in FIG. 10 and FIG. 11. At 1205, the source cell and candidate cells exchange messages for intra-DU interface and/or inter-DU intra-CU L1/L2 mobility preparation. The source cell sends L1/L2 mobility request messages to ask for L1/L2 mobility support from the can-didate cells (1205a) and candidate cells reply L1/L2 mobil-ity Response messages to confirm or reject L1/L2 mobility, and/or include configuration information in the response messages (1205b).

At 1210, the source cell sends RRCReconfiguration mes-sage(s) including the configurations for a set of candidate cells. Some of the configurations are to be applied upon a UE receiving this RRC message, e.g., measurement and report-ing configuration and TCI state configuration for candidate cells which can according to Release-15/16 specifications or the unified TCI framework in Release-17 specifications], and the rest are to be applied upon handover execution, e.g., information required for random access to the target cell. The UE replies with RRCReconfigurationComplete (1215).

According to the measurement and reporting configura-tion, the UE performs measurement for the candidate cells and reports the measurement results, e.g., L1-RSRP, L1-RSRQ, and L1-SINR values of candidate cells (1220). Based on the measurement report, the source cell decides an assistant cell and one or more associated TCI states to trigger inter-cell single-TRP or inter-cell multi-TRP operation (1225). By L1/L2 signaling to UE, e.g., sending a MAC CE and/or DCI indicating the assistant cell ID and/or TCI state to switch to, the source cell initiates the inter-cell single-TRP or inter-cell multi-TRP operation (1230).

After receiving the inter-cell single-TRP or inter-cell multi-TRP operation trigger command via L1/L2 signaling, the UE uses TCI states associated with the assistant cell, receives PDCCH/PDCSH and sends PUCCH/PUSCH from/to the assistant cell (1235). According to the measurement and reporting configuration, the UE performs measurement for the serving cell and/or assistant cell and/or candidate cells and reports the measurement results, e.g., L1-RSRP, L1-RSRQ, and L1-SINR values (1235). Based on the mea-surement report, the source cell and assistant cell coordi-nates and decides to hand over the UE to the assistant cell (1240).

By L1/L2 signaling to a UE, e.g., sending a MAC CE and/or DCI indicating the HO, the assistant cell initiates the HO (1245). After receiving the HO trigger command via L1/L2 signaling, the UE performs a CFRA procedure if a dedicated RACH preamble is indicated in RRCReconfigu-ration message at 1210, or performs CBRA procedure if no dedicated preamble is indicated, or the UE hands over to the assistant cell without performing the random access proce-dure if an RACH-less access is indicated in an RRCRecon-figuration message at 1210 or in the L1/L2 signaling at 1250 and sends C-RNTI MAC CE to the assistant cell to confirm the handover completion (1250).

At operation 1210, for one embodiment, the candidate cell pool and the associated configuration for each candidate cell can be configured and maintained in a manner of addition and/or modification and/or release, as shown below. The IE (Information Element) NonServingCellToAddMod can include the information of candidate cell ID, e.g., PCI and/or logical ID, and/or measurement ID that associates to a measurement and reporting configuration for the candidate cell, and/or TCI states (e.g., Rel-17 unified TCI states or Rel-15/16 TCI states) configuration for the candidate cell, and/or candidate cell configurations to be applied upon handover execution that is carried in IE reconfiguration-WithSync. TABLE 1 shows RRC reconfiguration information

TABLE 1

| RRCReconfiguration IE |
| --- |
| RRCReconfiguration-IEs ::= SEQUENCE { |
| nonServingCellConfig NonServingCellConfig OPTIONAL, -- |
| Need M |
| ... |
| } |
| NonServingCellConfig ::= SEQUENCE { |
| nonServingCellToRemoveList NonServingCellToRemoveList |
| OPTIONAL, -- Need N |
| nonServingCellToAddModList NonServingCellToAddModList |
| OPTIONAL, -- Need N |
| ... |
| } |
| NonServingCellToRemoveList ::= SEQUENCE (SIZE (1.. |
| maxNrofNonServingCells)) OF |
| NonServingCellId |
| NonServingCellToAddModList ::= SEQUENCE (SIZE (1.. |
| maxNrofNonServingCells)) OF |
| NonServingCellToAddMod |
| NonServingCellToAddMod ::= SEQUENCE { |
| nonServingCellId NonServingCellId, |
| cellId PhysCellId, |
| MeasId SEQUENCE (SIZE (1.. maxNrofnonServingCellMeasId)) |
| OF MeasId |
| OPTIONAL, -- Cond L1L2ReconfigAdd |
| tci-StateNonServingCell SEQUENCE |
| (SIZE(1..maxNrofTCI-StatesNonServingCell)) OF |
| TCI-StateIdNonServingCell OPTIONAL, -- Cond L1L2ReconfigAdd |
| nonServingCellMobilityConfig reconfigurationWithSync |
| OPTIONAL, -- Cond |
| L1L2ReconfigAdd |
| ... |
| } |
| NonServingCellId ::= INTEGER (1.. maxNrofNonServingCells) |
| TCI-StateNonServingCell ::= SEQUENCE { |
| tci-StateId TCI-StateIdNonServingCell, |
| qcl-TypeNonServingCell QCL-InfoNonServingCell, |
| ... |
| } |
| TCI-StateIdNonServingCell ::= INTEGER |
| (0..maxNrofTCI-StatesNonServingCell−1) |
| QCL-InfoNonServingCell ::= SEQUENCE { |
| cell NonServingCellId |
| referenceSignal CHOICE { |
| csi-rs CSI-RS-Index, |
| ssb SSB-Index |
| }, |
| qcl-Type ENUMERATED {typeA, typeB, typeC, typeD}, |
| ... |
| } |
| reconfigurationWithSync ::= SEQUENCE { |
| spCellConfigCommon ServingCellConfigCommon OPTIONAL, -- |
| Need M |
| newUE-Identity RNTI-Value, |
| t304 ENUMERATED {ms50, ms100, ms150, ms200, ms500, ms1000, |
| ms2000, ms10000}, |
| rach-ConfigDedicated CHOICE { |
| uplink RACH-ConfigDedicated, |
| supplementaryUplink RACH-ConfigDedicated |
| } OPTIONAL, -- Need N |
| ..., |
| [[ |
| smtc SSB-MTC OPTIONAL -- Need S |
| ]], |
| } |

For another embodiment, the candidate cell configurations to be applied upon handover execution can be carried in a transparent container that is forwarded by the source cell for the candidate cell.

In one more embodiment, a SpCell or a SCell can be explicitly configured to be a candidate cell for L1/L2-based mobility, e.g., adding the PCI or logical ID to the candidate cell pool. Alternatively, all cells in the same cell group as the serving cell, e.g., SpCell and SCell, are implicitly configured to be candidate cells for L1/L2-based mobility. If the candidate cell is in the same cell group as the serving cell, e.g., SpCell or SCell, delta configuration can be applied e.g., to configure ServingCellConfigCommon. That is, the SpCell configuration can be used as the default configuration and any parameters to be applied upon handover execution that are different from the default configuration can be explicitly configured.

Alternatively, the reference configuration can be explicitly indicated, e.g., a SCell can be indicated as the reference for delta configuration, and any parameters to be applied upon handover execution that are different from the reference can be explicitly configured.

For one more embodiment, if a cell with PCI other than the serving cell is configured for inter-cell beam management or inter-cell multi-TRP, it can be explicitly, e.g., adding the PCI or logical ID to the candidate cell pool, or implicitly configured to be a candidate cell for L1/L2-based mobility. For such a candidate cell, the TCI state configuration and/or SMTC configuration can be configured along with the inter-cell beam management or inter-cell multi-TRP configuration.

To configure RACH-less handover, required information including timing adjustment and/or UL grant can be carried in RRCReconfiguration message at 910. An example is shown in TABLE 2.

TABLE 2

| Reconfiguration with synchronization |
| --- |
| reconfigurationWithSync ::= SEQUENCE { |
| spCellConfigCommon ServingCellConfigCommon OPTIONAL, -- |
| Need M |
| newUE-Identity RNTI-Value, |
| t304 ENUMERATED {ms50, ms100, ms150, ms200, ms500, ms1000, |
| ms2000, ms10000}, |
| rach-ConfigDedicated CHOICE { |
| uplink RACH-ConfigDedicated, |
| supplementaryUplink RACH-ConfigDedicated |
| } OPTIONAL, -- Need N |
| ..., |
| [[ |
| smtc SSB-MTC OPTIONAL -- Need S |
| ]], |
| rachSkipConfig RACH-SkipConfig OPTIONAL -- Need N |
| } |
| RACH-SkipConfig ::= SEQUENCE { |
| taConfig BIT STRING (SIZE (12)), |
| ul-SchedInterval ENUMERATED {sf2, sf5, sf10, ... }, |
| ul-StartSubframe INTEGER (0..9..), |
| ul-Grant BIT STRING (SIZE (27)), OPTIONAL -- |
| Need N |
| ... |
| } |
| } |

The RRCReconfiguration message at 910 can include a measurement and reporting configuration. L1 measurement on SSBs (SS/PBCH blocks) and/or reference signals, e.g., periodical and/or semi-persistent and/or aperiodic CSI-RSs, and report value, e.g., L1-RSRP, L1-RSRQ, and L1-SINR, can be configured for RRM, e.g., in IE MeasObjectNR and/or for CSI, e.g., in IE CSI-MeasConfig. In one embodiment, to configure UE to report L1 measurement values (e.g., L1-RSRP, L1-RSRQ, and L1-SINR) in RRM measurement report, the RRC configuration can be specified as follows in RRC IE QuantityConfig.

TABLE 3

| Quantity Configuration |
| --- |
| QuantityConfig ::= SEQUENCE { |
|    quantityConfigNR-List SEQUENCE (SIZE |
|    (1..maxNrofQuantityConfig)) OF |
| QuantityConfigNR OPTIONAL, -- Need M |
|    ..., |
|    [[ |
|    quantityConfigEUTRA FilterConfig OPTIONAL -- Need M |
|    ]], |
|    [[ |
|    quantityConfigUTRA-FDD-r16 |
|    QuantityConfigUTRA-FDD-r16 OPTIONAL, -- Need M |
|    quantityConfigCLI-r16 FilterConfigCLI-r16 OPTIONAL -- Need M |
|      ]] |
|      [[ |
|    quantityConfigNR-List-L1 SEQUENCE (SIZE |
| (1..maxNrofQuantityConfigL1)) OF |
| QuantityConfigNR-L1 OPTIONAL, -- Need M |
|      ]] |
| } |
| QuantityConfigNR-L1::= SEQUENCE { |
|    quantityConfigCell QuantityConfigRS-L1, |
|    quantityConfigRS-Index QuantityConfigRS-L1 OPTIONAL -- Need M |
| } |
| QuantityConfigRS-L1 ::= SEQUENCE { |
|   SsbL1 L1-RSRP, |
|    csi-RS-L1 L1-RSRP |
| } |

Once the source cell determines the target cell for handover, the serving gNB sends the handover trigger command by an L1/L2 signaling that includes the one-bit HO indication, and/or target cell ID, and/or BWP ID, and/or CORE-SET ID, and/or TCI state(s) to be activated or used for the target cell, and/or new UE identity (e.g., C-RNTI), and/or one-bit indication of with or without random access, and/or TA value, and/or UL grant.

In one example, a timing instance to apply the pre-configured RRC parameters and/or resetting any MAC procedures can be the time instant configured to switch to the target cell TCI state. In another example, the timing instance to apply the pre-configured RRC parameters and/or resetting any MAC procedures can be a later time instant than switching to the target cell TCI state, where the gap between switching to the target cell TCI state and applying the pre-configured RRC parameters and/or resetting any MAC procedures can be configurable.

In one embodiment, the HO trigger indication can be sent via DCI as an L1 signaling. If TCI is present in DCI format 1_1/1_2 with and/or without downlink assignment indicating TCI state(s) associated with a candidate cell, a reserved bit in DCI format 1_1/1_2 with and/or without downlink assignment can be used to indicate whether HO to the candidate cell is triggered or not, or a new DCI format including the HO trigger indication field can be designed.

In one embodiment, a new MAC CE, i.e., handover MAC CE, is introduced, which is identified by a MAC subheader with LCID or by a MAC subheader with eLCID, and includes target cell ID, and/or BWP ID, and/or CORESET ID, and/or TCI state(s) to be activated or used for the target cell according to TCI states configuration in Release-15/16 specifications or the unified TCI framework in Release-17 3GPP standard specification, and/or new UE identity (e.g., C-RNTI), and/or one-bit indication of with or without random access, and/or TA value, and/or UL grant.

Figures 13, 14:
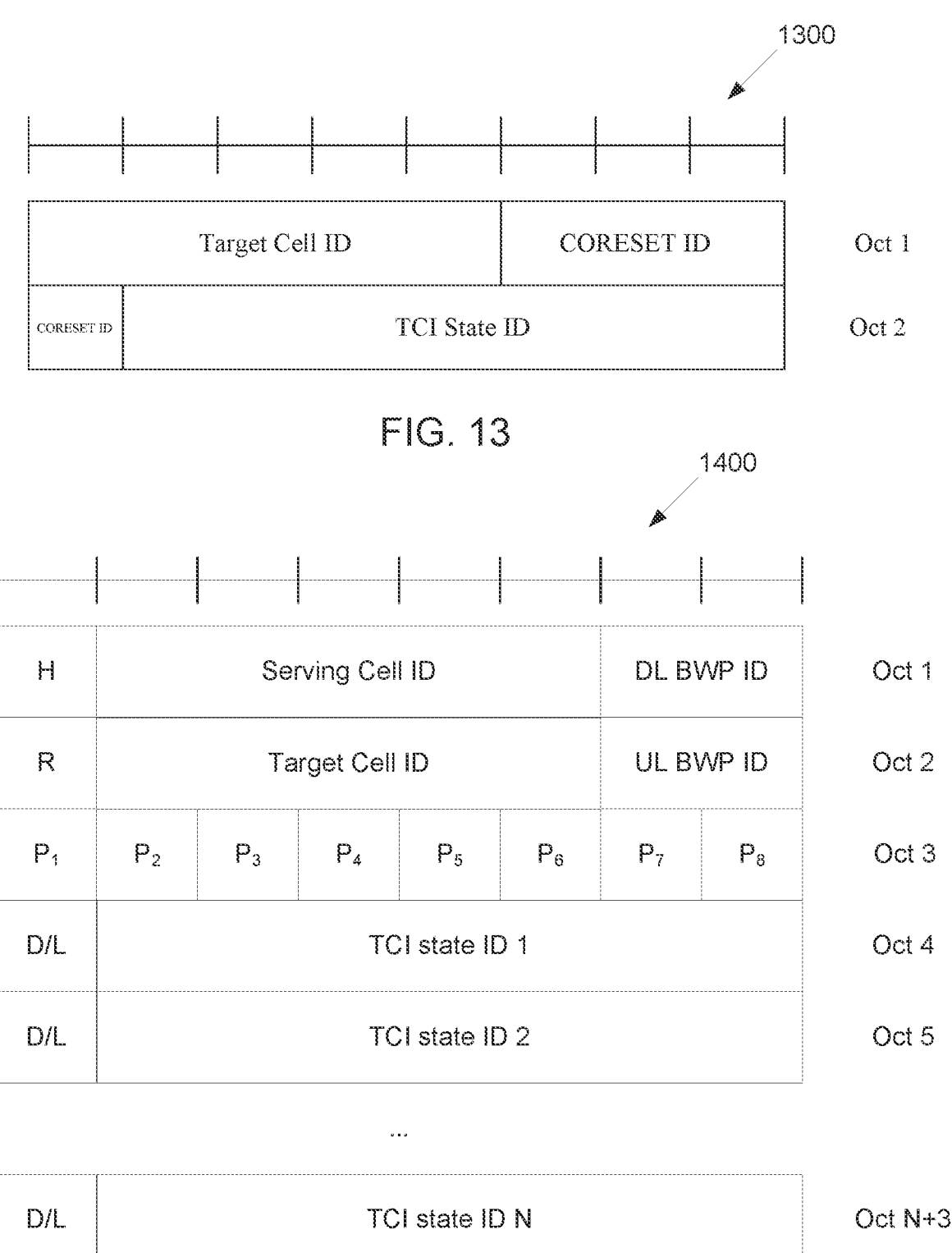
FIG. 13 illustrates a handover trigger using TCI State Indication for UE-specific PDCCH MAC CE according to embodiments of the present disclosure.
FIG. 14 illustrates a handover trigger MAC CE enhanced by unified TCI states activation/deactivation MAC CE according to embodiments of the present disclosure.

In one embodiment, a TCI states activation/deactivation for UE-specific PDSCH MAC CE and/or TCI State indication for UE-specific PDCCH MAC CE (e.g., as shown in 3GPP standard specification) can be used to implicitly indicate the handover command. If the field of serving cell ID carries a PCI (physical cell ID) that is different than the current serving cell PCI, the UE executes handover to the target cell and switch to the indicated TCI state. FIG. 13 illustrate an example of using TCI state indication for UE-specific PDCCH MAC CE.

FIG. 13 illustrates a handover trigger using TCI State Indication for UE-specific PDCCH MAC CE 1300 according to embodiments of the present disclosure. An embodiment of the handover trigger using TCI State Indication for UE-specific PDCCH MAC CE 1300 shown in FIG. 13 is for illustration only.

In another embodiment, the unified TCI states activation/deactivation MAC CE, as illustrated in 3GPP standard specification, can be enhanced to be used as the handover trigger signal, where the DL/UL BWP ID is associated with the target cell, and the TCI state IDs activated in the MAC CE are associated with the target cell as configured by RRC signaling.

FIG. 14 illustrates a handover trigger MAC CE enhanced by unified TCI states activation/deactivation MAC CE 1400 according to embodiments of the present disclosure. An embodiment of the handover trigger MAC CE enhanced by unified TCI states activation/deactivation MAC CE 1400 shown in FIG. 14 is for illustration only.

In one example as shown in FIG. 14, the "H" field can be used to indicate whether the MAC CE is to trigger the handover, e.g., 0 indicates not for handover, 1 indicates to trigger handover. If the handover is triggered, the target cell ID can be indicated using 5 reserved bits.

In another example, one reserved bit can be used to indicate whether the MAC CE is to trigger the handover, e.g., 0 indicates not for handover, 1 indicates to trigger handover. If the handover is triggered, the serving cell ID can be replaced by the target cell ID with or without one-bit indication, e.g., one another reserved bit can be used to indicate whether the cell ID field is used to indicate the serving cell ID or the target cell ID.

Figure 15:
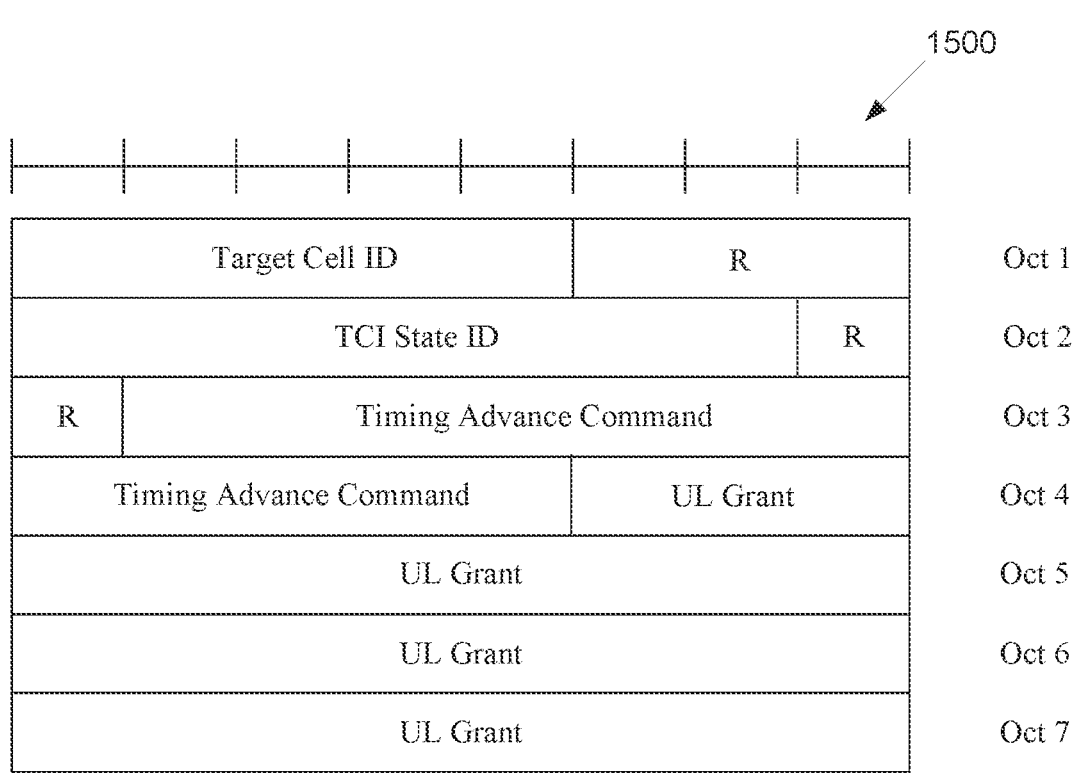
FIG. 15 illustrates a RACH-less Handover MAC CE according to embodiments of the present disclosure.

FIG. 15 illustrates a RACH-less handover MAC CE 1500 according to embodiments of the present disclosure. An embodiment of the RACH-less handover MAC CE 1500 shown in FIG. 15 is for illustration only.

In one embodiment, RACH-less handover MAC CE is introduced, which is identified by a MAC subheader with LCID or by a MAC subheader with eLCID. The RACH-less handover MAC CE includes a variable size comprising following fields as shown in FIG. 15:

Target cell ID: this field indicates the identity of the Target Cell for handover. The length of the field is 5 bits;

TCI state ID: this field indicates the TCI state identified by TCI-StateId. The length of the field is 7 bits; and R: reserved bit, set to "0";

Timing advance command: the Timing Advance Command field indicates the index value TA used to control the amount of timing adjustment in terms of the current timing. The size of the Timing Advance Command field is 12 bits; and UL grant: the uplink grant field indicates the resources to be used on the uplink. The size of the UL grant field is 27 bits.

Figure 16:
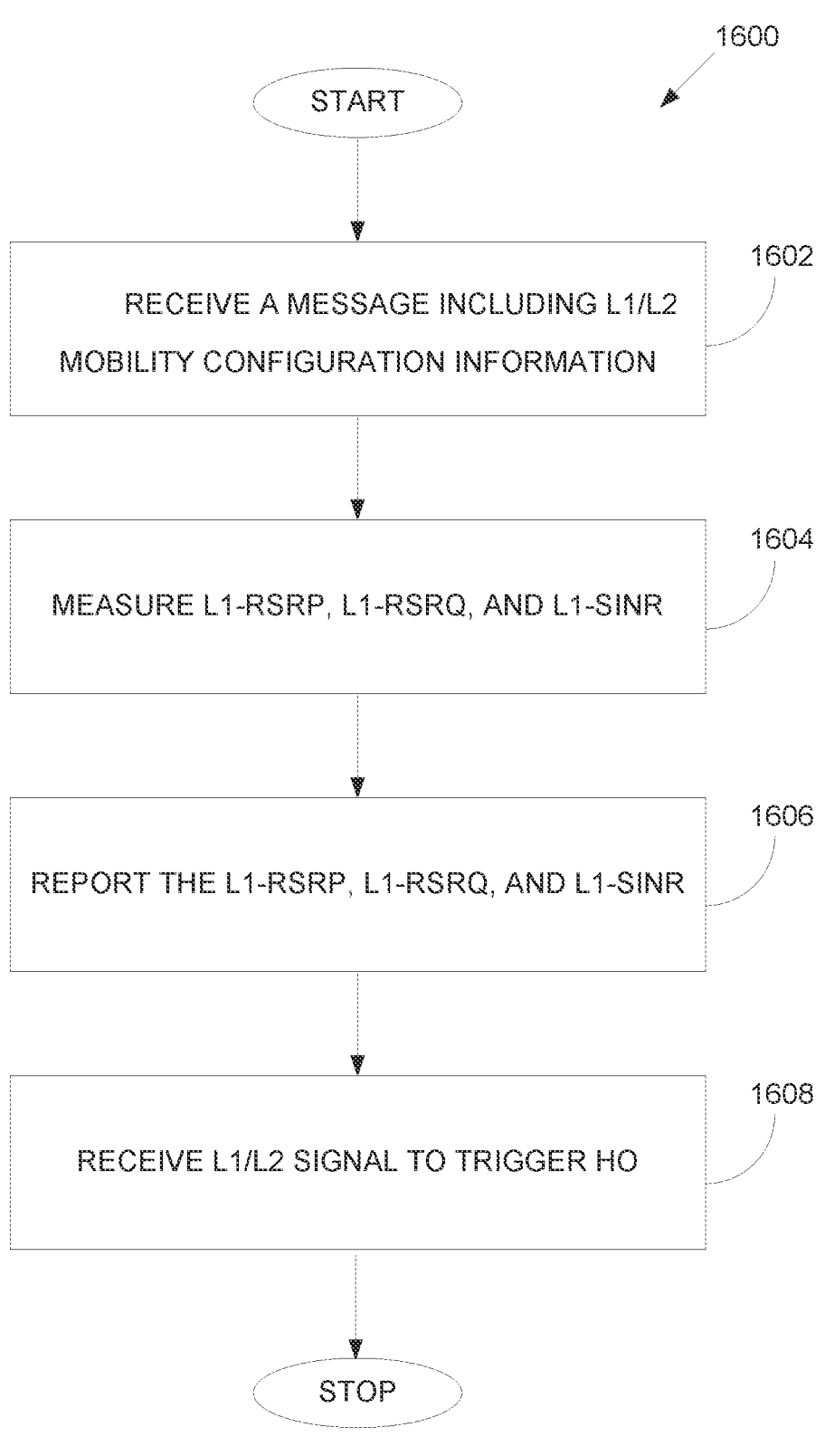
FIG. 16 illustrates a flowchart of method for L1/L2-based inter-cell mobility according to embodiments of the present disclosure.

FIG. 16 illustrates a flowchart of method 1600 for L1/L2-based inter-cell mobility according to embodiments of the present disclosure. The method 1600 as may be performed by a UE (e.g., 111-116 as illustrated in FIG. 1. An embodiment of the method 1300 shown in FIG. 13 is for illustration only. One or more of the components illustrated in FIG. 16 can be implemented in specialized circuitry configured to perform the noted functions or one or more of the components can be implemented by one or more processors executing instructions to perform the noted functions.

As illustrated in FIG. 16, the method begins at step 1602. In step 1602, the UE receives, from a BS, a message including L1/L2 mobility configuration information.

In step 1602, the L1/L2 mobility configuration information includes: information of a TCI state for each of the at least one candidate cell; information of measurement and report configuration for the at least one candidate cell and measurement report quantities; information of reference signals comprising at least one of SSBs; and CSI-RSs; and the measurement report quantities comprises the L1-RSRP, the L1-RSRQ, and the L1-SINR.

In step 1602, the L1/L2 mobility configuration information further includes a timer duration value.

In step 1602, the L1/L2 mobility configuration information further includes a maximum counter value.

Subsequently, in step 1604, the UE measures, based on a CSI-RS received from at least one candidate cell of candidate BS, L1-RSRP, L1-RSRQ, and L1-SINR of the at least one candidate cell.

In step 1604, the at least one candidate cell includes: a SpCell and SCells; a subset of the SpCell and the SCells with an indication of being a candidate cell for the SpCell and the SCells; configuration information for cells in a same cell group with a serving cell, the configuration information including serving cell configuration information and delta configuration information that is determined based on a current SpCell and a SCell with an indication of being a reference cell; and assistant configuration information for assistant cells configured for an inter-cell beam management operation or an inter-cell multi-TRP operation, including an indication of being the candidate cell.

Next, in step 1608, the UE reports, to a target cell, the L1-RSRP, the L1-RSRQ, and the L1-SINR of the at least one candidate cell.

Finally, in step 1610, the UE receives an L1/L2 signal to trigger a HO operation to a target cell, the L1/L2 signal including a TCI state switch to the target cell.

In one embodiment, the UE performs the HO operation to the target cell without a random-access channel (RACH-less).

In one embodiment, the UE receives, from the target cell, a TCI state using an inter-cell beam management operation or an inter-cell multi-TRP operation; transmits, to the target cell, an L1 measurement result including the L1-RSRP, the L1-RSRQ, and the L1-SINR of the at least one candidate cell; and receives, from the target cell, the L1/L2 signal to trigger the HO operation to the target cell.

In one embodiment, the UE trigger the HO operation based on one of: a MAC CE including at least one of a one-bit HO indication, a target cell logical ID, a target cell TCI state to be activated, and a one-bit indication of HO operation without a RACH-less HO; or DCI information.

In one embodiment, the UE transmits, to the target cell, a C-RNTI MAC CE for confirming a HO operation completion when executing a HO operation without a random-access channel (RACH-less HO).

In one embodiment, the processor is further configured to: start a timer based on the timer duration value when the UE receives the TCI state switch instructing the UE to use a beam received from the at least one candidate cell of the candidate BS; re-start the timer when the UE receives the TCI state switch instructing the UE to use a beam from a cell that is different than the at least one candidate cell; stop the timer when the UE receives the TCI state switch instructing the UE to use a beam from a serving cell; and execute the HO operation to the at least one candidate cell when the timer for the at least one candidate cell expires.

In one embodiment, the UE set a counter based on the maximum counter value when the UE receives the TCI state switch instructing the UE to use the beam from the at least one candidate cell, increase the counter by one when the UE receives the TCI state switch instructing the UE to use the beam from the at least one candidate cell, and execute the HO operation to the at least one candidate cell when the counter reaches the maximum counter value for the at least one candidate cell.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:

a transceiver configured to receive, from a serving base station (BS), a message including layer 1/layer 2 (L1/L2) mobility configuration information including a timer duration value for a timer that is enabled or disabled when receiving a transmission configuration indicator (TCI) state switch; and a processor operably coupled to the transceiver, the processor configured to measure, based on a channel status information-reference signal (CSI-RS) received from at least one candidate cell of a candidate BS, L1-reference signal received power (L1-RSRP), L1-reference signal received quality (L1-RSRQ), and L1-signal to interference and noise ratio (L1-SINR) of the at least one candidate cell, wherein the transceiver is further configured to:

report the L1-RSRP, the L1-RSRQ, and the L1-SINR of the at least one candidate cell, and receive an L1/L2 signal to trigger a handover (HO) operation to a target cell, the L1/L2 signal including the TCI state switch instructing the UE to use beams associated with the candidate BS.

2. The UE of claim 1, wherein the processor is further configured to perform the HO operation to the target cell without a random-access channel (RACH-less).

3. The UE of claim 1, wherein the transceiver is further configured to:

receive, from the target cell, a TCI state using an inter-cell beam management operation or an inter-cell multi-transmission and reception point (TRP) operation;

transmit, to the target cell, an L1 measurement result including the L1-RSRP, the L1-RSRQ, and the L1-SINR of the at least one candidate cell; and receive, from the target cell, the L1/L2 signal to trigger the HO operation to the target cell.

4. The UE of claim 1, wherein the L1/L2 mobility configuration information includes:

information of a TCI state for each of the at least one candidate cell;

information of measurement and report configuration for the at least one candidate cell and measurement report quantities;

information of reference signals comprising at least one of synchronization signal (SS)/physical broadcasting channel (PBCH) blocks (SSBs) and CSI-RSs; and the measurement report quantities comprise the L1-RSRP, the L1-RSRQ, and the L1-SINR.

5. The UE of claim 1, wherein the at least one candidate cell includes:

a special cell (SpCell) and secondary cells (SCells);

a subset of the SpCell and the SCells with an indication of being a candidate cell for the SpCell and the SCells;

configuration information for cells in a same cell group with a serving cell, the configuration information including serving cell configuration information and delta configuration information that is determined based on a current SpCell and a SCell with an indication of being a reference cell; and configuration information for assistant cells configured for an inter-cell beam management operation or an inter-cell multi-transmit and reception point (TRP) operation, including an indication of being the candidate cell.

6. The UE of claim 1, wherein the processor is further configured to trigger the HO operation based on one of:

a medium access control control element (MAC CE) including at least one of a one-bit HO indication, a target cell logical identification (ID), a target cell TCI state to be activated, and a one-bit indication of HO operation without a random-access channel (RACH-less HO); or downlink control channel (DCI) information.

7. The UE of claim 1, wherein the transceiver is further configured to transmit, to the target cell, a cell-radio network temporary identifier (C-RNTI) medium access control control element (MAC CE) for confirming a HO operation completion when executing a HO operation without a random-access channel (RACH-less HO).

8. The UE of claim 1, wherein the processor is further configured to:

start the timer based on the timer duration value when the UE receives the TCI state switch instructing the UE to use a beam received from the at least one candidate cell of the candidate BS, re-start the timer when the UE receives the TCI state switch instructing the UE to use a beam from a cell that is different than the at least one candidate cell, stop the timer when the UE receives the TCI state switch instructing the UE to use a beam from a serving cell, and execute the HO operation to the at least one candidate cell when the timer for the at least one candidate cell expires.

9. The UE of claim 8, wherein:

the L1/L2 mobility configuration information further includes a maximum counter value; and the processor is further configured to:

set a counter based on the maximum counter value when the UE receives the TCI state switch instructing the UE to use the beam from the at least one candidate cell, increase the counter by one when the UE receives the TCI state switch instructing the UE to use the beam from the at least one candidate cell, and execute the HO operation to the at least one candidate cell when the counter reaches the maximum counter value for the at least one candidate cell.

10. A base station (BS) in a wireless communication system, the BS comprising:

a processor configured to generate a message including layer 1/layer 2 (L1/L2) mobility configuration information; and a transceiver operably connected to the processor, the transceiver configured to:

transmit, to a user equipment (UE), the message including the L1/L2 mobility configuration information including a timer duration value for a timer that is enabled or disabled when the UE receives a transmission configuration indicator (TCI) state switch, receive, from the UE, a report including L1-reference signal received power (L1-RSRP), L1-reference signal received quality (L1-RSRQ), and L1-signal to interference and noise ratio (L1-SINR) of at least one candidate cell, wherein the L1-RSRP, the L1-RSRQ and the L1-SINR are based on a channel status information-reference signal (CSI-RS) corresponding to the at least one candidate cell of a candidate BS, and transmit a L1/L2 signal to the UE for triggering a handover (HO) operation to a target cell, including the TCI state switch instructing the UE to use beams associated with the candidate BS.

11. The BS of claim 10, wherein the L1/L2 mobility configuration information includes:

information of TCI state for each of the at least one candidate cell;

information of measurement and report configuration for the at least one candidate cell and measurement report quantities;

information of reference signals comprising at least one of synchronization signal (SS)/physical broadcasting channel (PBCH) blocks (SSBs) and CSI-RSs; and the measurement report quantities comprise the L1-RSRP, the L1-RSRQ, and the L1-SINR.

12. A method of a user equipment (UE) in a wireless communication system, the method comprising:

receiving, from a serving base station (BS), a message including layer 1/layer 2 (L1/L2) mobility configuration information including a timer duration value for a timer that is enabled or disabled when receiving a transmission configuration indicator (TCI) state switch;

measuring, based on a channel status information-reference signal (CSI-RS) received from at least one candidate cell of a candidate BS, L1-reference signal received power (L1-RSRP), L1-reference signal received quality (L1-RSRQ), and L1-signal to interference and noise ratio (L1-SINR) of the at least one candidate cell;

reporting the L1-RSRP, the L1-RSRQ, and the L1-SINR of the at least one candidate cell; and receiving an L1/L2 signal to trigger a handover (HO) operation to a target cell, wherein the L1/L2 signal includes the TCI state switch instructing the UE to use beams associated with the candidate BS.

13. The method of claim 12, further comprising performing the HO operation to the target cell without a random-access channel (RACH-less).

14. The method of claim 12, further comprising:

receiving, from the target cell, a TCI state using an inter-cell beam management operation or an inter-cell multi-transmission and reception point (TRP) operation;

transmitting, to the target cell, an L1 measurement result including the L1-RSRP, the L1-RSRQ, and the L1-SINR of the at least one candidate cell; and receiving, from the target cell, the L1/L2 signal to trigger the HO operation to the target cell.

15. The method of claim 12, wherein the L1/L2 mobility configuration information includes:

information of TCI state for each of the at least one candidate cell;

information of measurement and report configuration for the at least one candidate cell and measurement report quantities;

information of reference signals comprising at least one of synchronization signal (SS)/physical broadcasting channel (PBCH) blocks (SSBs) and CSI-RSs; and the measurement report quantities comprise the L1-RSRP, the L1-RSRQ, and the L1-SINR.

16. The method of claim 12, wherein the at least one candidate cell includes:

a special cell (SpCell) and secondary cells (SCells);

a subset of the SpCell and the SCells with an indication of being a candidate cell for the SpCell and the SCells;

configuration information for cells in a same cell group with a serving cell, the configuration information including serving cell configuration information and delta configuration information that is determined based on a current SpCell and a SCell with an indication of being a reference cell; and configuration information for assistant cells configured for an inter-cell beam management operation or an inter-cell multi-transmit and reception point (TRP) operation, including an indication of being the candidate cell.

17. The method of claim 12, further comprising triggering the HO operation based on one of:

a medium access control control element (MAC CE) including at least one of a one-bit HO indication, a target cell logical identification (ID), a target cell TCI state to be activated, and a one-bit indication of HO operation without a random-access channel (RACH-less HO); and downlink control channel (DCI) information.

18. The method of claim 12, further comprising transmitting, to the target cell, a cell-radio network temporary identifier (C-RNTI) medium access control control element (MAC CE) for confirming a HO operation completion when executing a HO operation without a random-access channel (RACH-less HO).

19. The method of claim 12, further comprising:

starting the timer based on the timer duration value when the UE receives the TCI state switch instructing the UE to use a beam received from the at least one candidate cell of the candidate BS;

re-starting the timer when the UE receives the TCI state switch instructing the UE to use a beam from a cell that is different than the at least one candidate cell;

stopping the timer when the UE receives the TCI state switch instructing the UE to use a beam from a serving cell; and executing the HO operation to the at least one candidate cell when the timer for the at least one candidate cell expires.

20. The method of claim 19, further comprising:

setting a counter based on a maximum counter value when the UE receives the TCI state switch instructing the UE to use the beam from the at least one candidate cell;

increasing the counter by one when the UE receives the TCI state switch instructing the UE to use the beam from the at least one candidate cell; and executing the HO operation to the at least one candidate cell when the counter reaches the maximum counter value for the at least one candidate cell, wherein the L1/L2 mobility configuration information further includes the maximum counter value.

* * * * *